UNITED STATES PATENT OFFICE.

URIAH CUMMINGS, OF NEW HAVEN, CONNECTICUT.

CEMENT.

SPECIFICATION forming part of Letters Patent No. 402,511, dated April 30, 1889.

Application filed January 26, 1889. Serial No. 297,678. (No specimens.)

*To all whom it may concern:*

Be it known that I, URIAH CUMMINGS, a citizen of the United States, residing at New Haven, in the county of New Haven and State of Connecticut, have invented a new and useful Improvement in Cements, of which the following is a specification.

This invention has the object to produce a new hydraulic cement which can be manufactured at less cost than those now known, and which is less liable to disintegrate and decay, especially when exposed to the action of sea-water. The hydraulic cements which are found in the markets or are known in the art, whether natural or artificial, are composed either of the double silicate of lime and alumina or the triple silicate of lime, magnesia, and alumina. In all of these cements alumina forms one of the principal ingredients, and is the cause of the disintegration or decay of the cement, especially when the latter is exposed to the action of sea-water.

My object is to produce a hydraulic cement which is practically free from alumina; and to that end I produce a cement from the silicate of magnesia, either natural or artificial. Silicate of magnesia occurs in nature in the rocks known as serpentine and its varieties—such, for instance, as steatite, oriental verde-antique, and others. I calcine this rock in kilns of any ordinary or suitable construction, and then pulverize or grind the calcined rock in the usual way. In calcining ordinary cement rocks or mixtures a large quantity of heat is consumed in expelling the carbon dioxide from the carbonates of lime and magnesia. As the silicate of magnesia contains practically no carbonate, no heat is required for the decomposition of any carbonate and the expulsion of carbon dioxide, but only so much heat is required as is necessary to expel the water of crystallization. This can be accomplished with much less fuel than is required for the calcination of ordinary cement rocks or mixtures. When the calcined rock has been ground or pulverized, it is ready to set upon the addition of water. The cement so produced from the single silicate of magnesia possesses all useful qualities of an efficient hydraulic or Portland cement, but is much more constant and durable in use under the influences of sea-water, while it is produced in less time and at less cost than the hydraulic and Portland cements now known.

In some instances it may be desirable to grind the rock and to wet it and form it into cakes before calcination, in order to produce a homogeneous product. Some varieties of serpentine, especially that known as oriental verde-antique, contain a small percentage of carbonate of lime, which is not objectionable. Other varieties of serpentine contain a slight excess of silica, which would prevent the production of a first-class cement when calcined and ground alone. This difficulty is, however, easily overcome by adding a sufficient quantity of a base—such as carbonate of lime or magnesia, preferably the former, because the cheapest—to combine with the excess of silica.

Instead of using for the production of my improved hydraulic cement a natural rock consisting, essentially, of silicate of magnesia, the same result can be obtained artificially by mixing finely-pulverized silica and carbonate of magnesia, preferably in about the proportions of twenty-six parts, by weight, of silica to seventy-three parts of carbonate of magnesia, and subjecting the mixture to calcination, whereby a silicate of magnesia is produced which upon being pulverized forms a hydraulic cement of the most permanent character. This artificially-prepared mixture requires for its calcination a larger quantity of fuel than the natural rock; but the quality of the resulting cement is practically the same as to its character for durability.

I claim as my invention—

1. As a new article of manufacture, a hydraulic cement consisting of silicate of magnesia calcined and pulverized, substantially as set forth.

2. As a new article of manufacture, a hydraulic cement containing, principally, a single silicate of magnesia calcined and pulverized, substantially as set forth.

3. As a new article of manufacture, a hydraulic cement consisting of silicate of magnesia and lime calcined and pulverized, substantially as set forth.

URIAH CUMMINGS.

Witnesses:
FRED C. EARLE,
LILLIAN D. KELSEY.